Aug. 6, 1940.    C. C. COOK ET AL    2,210,617
CRUCIBLE GLASS FEEDER
Filed Aug. 5, 1938    3 Sheets-Sheet 1

Clyde C. Cook
David W. Cook    INVENTOR

BY Victor J. Evans & Co.
ATTORNEYS

Aug. 6, 1940.  C. C. COOK ET AL  2,210,617
CRUCIBLE GLASS FEEDER
Filed Aug. 5, 1938   3 Sheets-Sheet 2
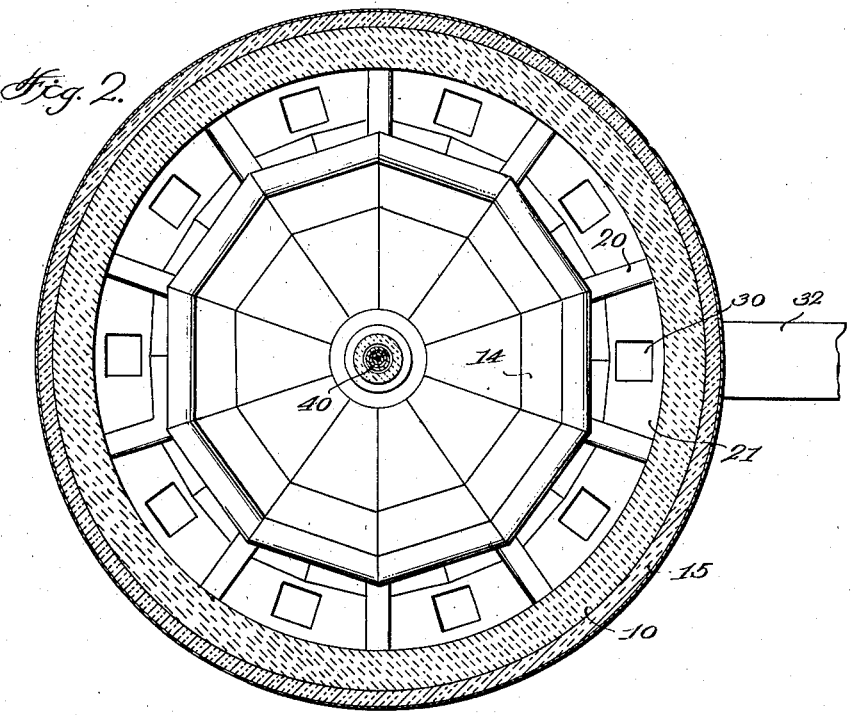
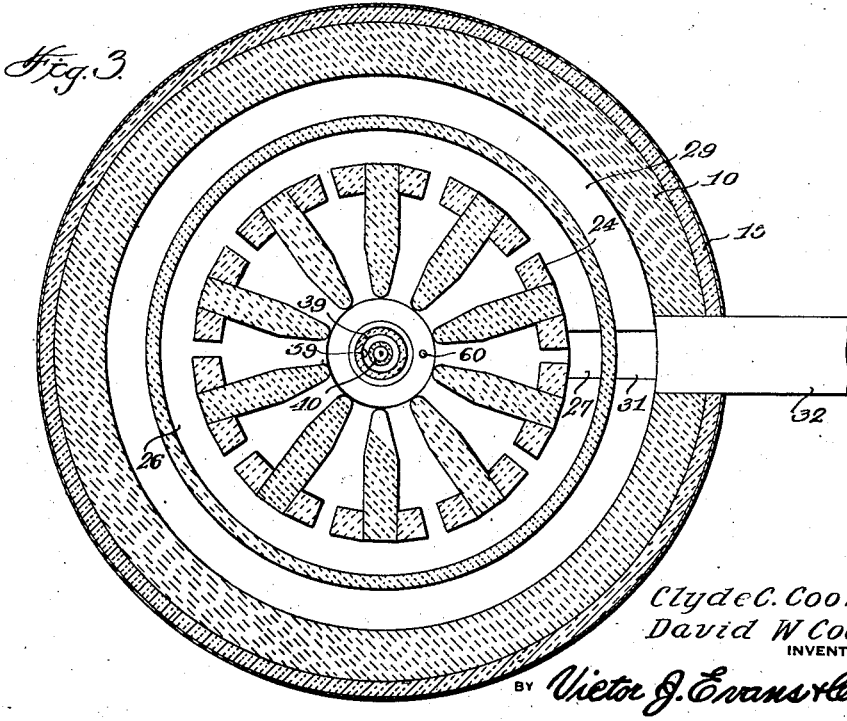
Clyde C. Cook +
David W Cook
INVENTOR
BY Victor J. Evans & Co.
ATTORNEYS Aug. 6, 1940.    C. C. COOK ET AL    2,210,617
CRUCIBLE GLASS FEEDER
Filed Aug. 5, 1938    3 Sheets-Sheet 3

Clyde C. Cook
David W. Cook
INVENTOR

BY Victor J. Evans & Co.
ATTORNEYS

Patented Aug. 6, 1940

2,210,617

UNITED STATES PATENT OFFICE 2,210,617

CRUCIBLE GLASS FEEDER

Clyde C. Cook and David W. Cook, Clarion, Pa.

Application August 5, 1938, Serial No. 223,364

2 Claims. (Cl. 49—53)

This invention relates to a crucible glass feeder.

In the present day method of melting, refining and feeding glass, the batch is melted in a large body, and the flow of glass cuts channels through this large body of glass allowing portions of it to lay dormant. From time to time, this dormant glass sluffs off into the stream of flowing glass thereby causing two different natures of glass in one body, commonly known as cord. Cord in finished glassware will cause the glass to break down.

With this disadvantage in mind, the present invention provides apparatus in which the molten glass is fed from the crucible until it is completely drained so that no dormant glass can form in the crucible to cause cord.

Cord may also be formed by the merging of two different temperatures of glass, and this occurs in the present day of melting, refining and feeding glass, because the outer surface of the container in which the glass batch is melted, refined and fed, is exposed to atmospheric temperatures. Atmospheric temperature lowers the temperature of the glass that is in contact with the container while the glass nearer the center is of higher temperature thus causing cord.

To eliminate this condition the present invention provides apparatus in which the batch is melted, refined and fed while being completely surrounded by flame so that the crucible and the body of glass are always of the same temperature.

Another object of the invention is to provide apparatus in which the glass batch is melted, refined and fed from the same container to reduce the amount of fuel required per ton of glassware produced over the present day practice. For instance, in the present way of melting, refining and feeding, the batch is completely melted and refined in other containers apart from the feeding device. Ordinarily, after the batch has been completely melted into molten glass, the glass then passes from a channel into a refining compartment which must be held at a high temperature and requires a considerable amount of fuel. The glass then passes through long channels, which also must be kept heated, and this requires a large amount of fuel. The molten glass then enters the feeder which also must have fuel burners to kep the glass at working temperature. Also a large percentage of heat energy escapes by radiation through this entire construction because the whole construction is exposed to atmospheric temperature. In accordance with the present invention the flame is directed upon the glass batch, where it spends its greatest energy and is then drawn around the outside of the crucible thereby melting the batch within. A selective and controlled portion of the flame is drawn underneath the crucible and around the outside of the feeder well to control the temperature of the glass flowing within. The flame then passes to various flues and out through a damper controlled main flue to the annealing furnace where the flame is used to anneal the glassware.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 2 is a cross sectional view taken on the line 2—2 of Figure 1.

Figure 3 is a cross sectional view taken on the line 3—3 of Figure 1.

Figures 1, 5:
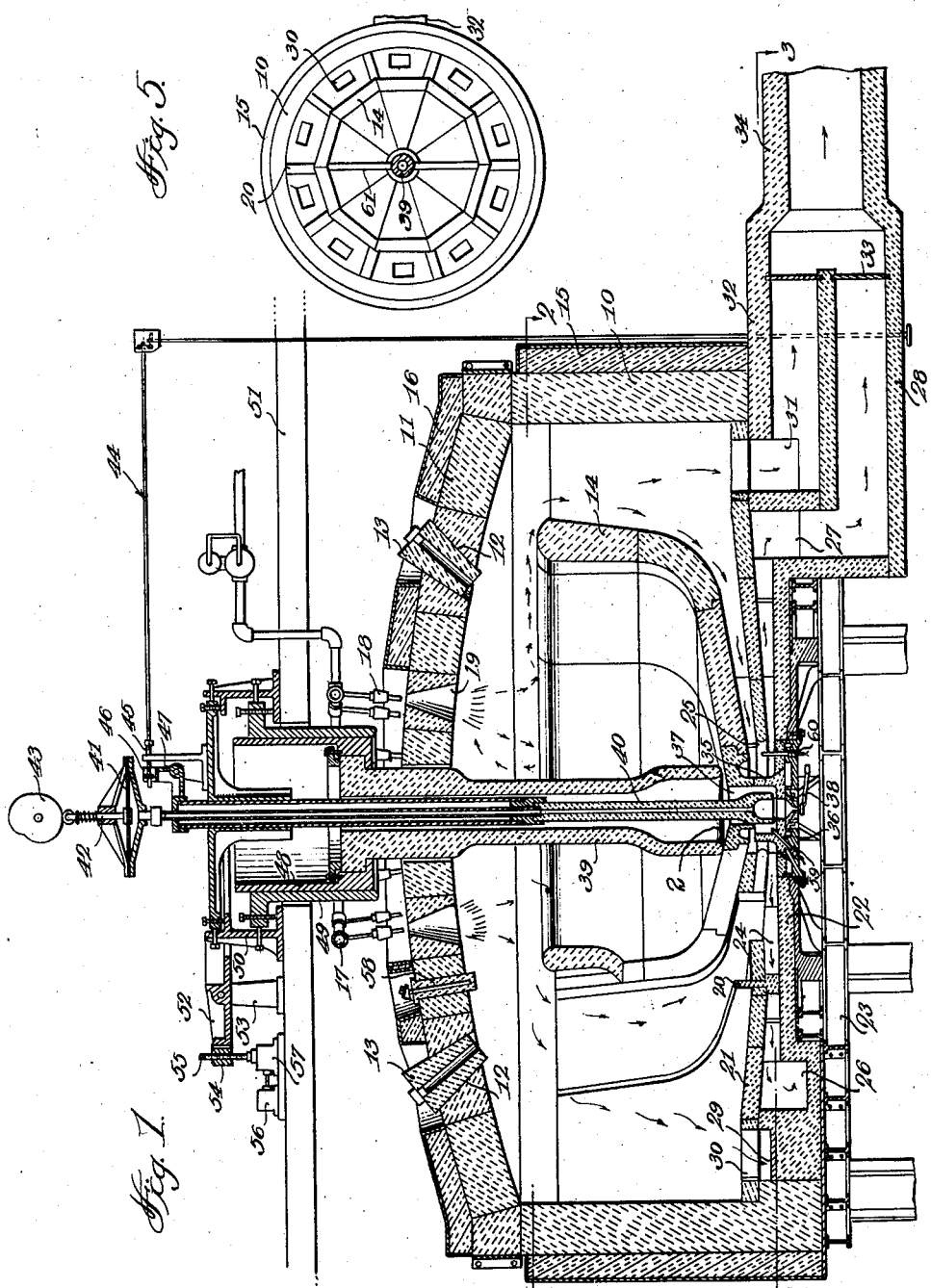
Figure 1 is a vertical sectional view of a crucible glass feeder constructed in accordance with the invention.
Figure 5 is a plan view of a modified form of the invention, drawn to reduced scale, and showing a partition in the crucible to permit different colors of glass being treated.
Figure 4:
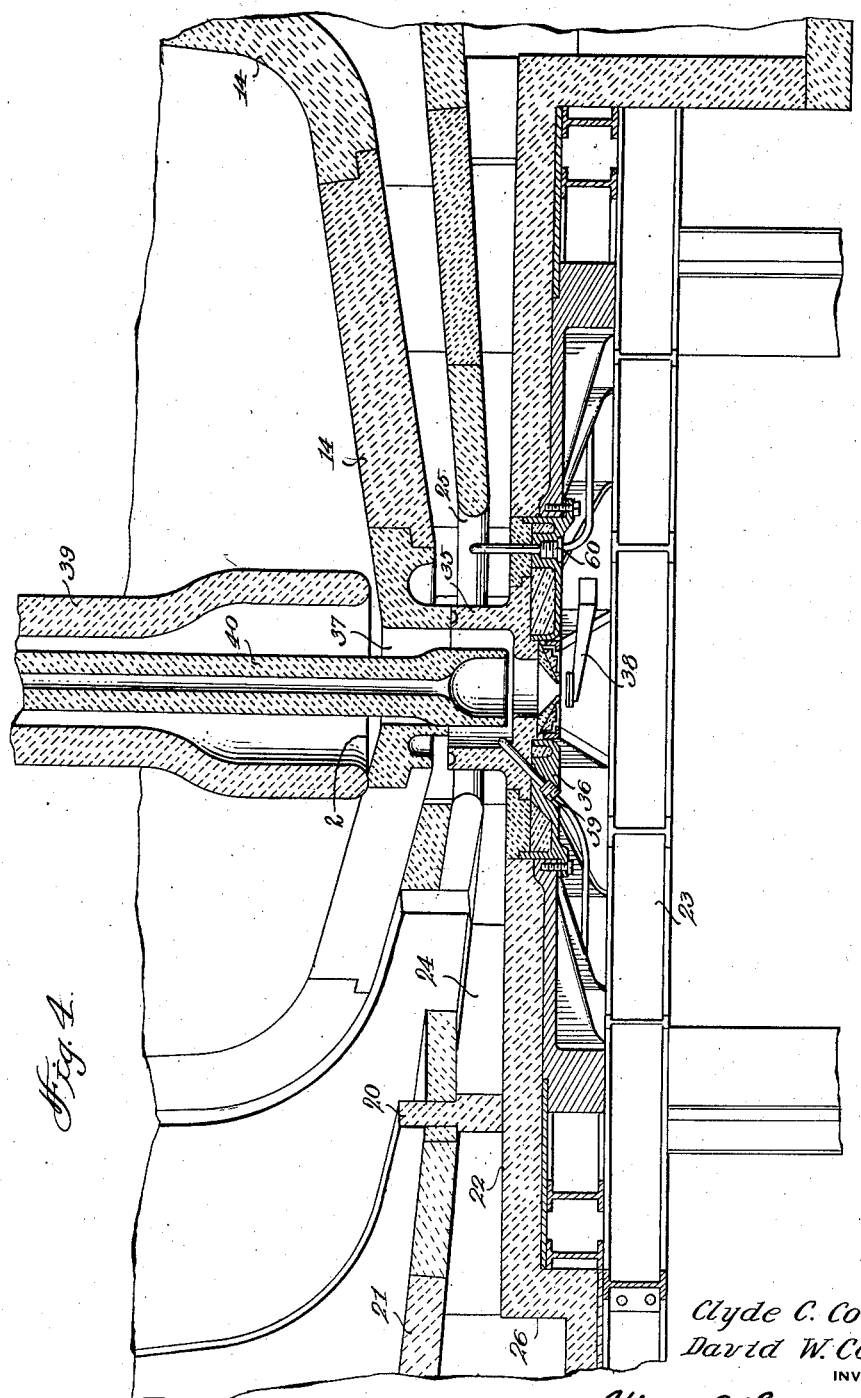
Figure 4 is an enlarged detail vertical sectional view showing the feeding mechanism.

Referring now to the drawings in which like characters of reference designate similar parts in the various views, 10 designates an oven which is substantially cylindrical in contour and is provided with an arched top 11 having openings 12 therein which are normally closed by plugs 13. The plugs may be removed to permit the batch of glass to be inserted in the crucible 14 through the medium of chutes or otherwise. The wall of the oven is provided with insulation as shown at 15 and also the arched top 11 is provided with insulation as shown at 16.

An annular fuel pipe 17 is secured in any preferred manner above the arched top 11 and concentric therewith, and is provided with a plurality of fuel nozzles 18 which are disposed in registration with respective openings 19 in the top 11 to direct the flame downward upon the top of the glass batch in the crucible 14.

The crucible 14 is concentrically disposed within the oven 10 and has its top spaced from the top 11 of the oven while the wall of the crucible is spaced from the wall of the oven so that the flame may be deflected from the glass batch outwardly and pass downwardly in the oven along the wall of the crucible thence underneath the crucible so that the glass batch will be entirely surrounded by flame.

The crucible is supported upon the edges of vertically disposed partitions 20 which extend radially in the oven and project underneath the bottom of the crucible.

The oven 10 is provided with a bottom wall 21 and below this bottom wall is provided with a second bottom wall 22. A platform 23 extends underneath the oven to support the same. The superposed bottom walls 21 and 22 are spaced apart by spacers 24. The uppermost bottom wall 21 is provided centrally with an opening 25 which establishes communication between the chamber in the oven outside of the crucible and the flues formed by the spacers 24 between both bottom walls. The lowermost bottom wall is provided at the ends of the spacers with an annular channel 26 which communicates through a port 27 with a flue 28. Likewise the uppermost bottom wall 21 is provided with an annular channel 29 which communicates with said chamber in the oven through a port 30 and which communicates through a port 31 with a flue 32. The flues 28 and 32 are controlled by a conventional damper 33.

As shown by dotted lines in Figure 1 the course of the flame is downward on top of the batch in the crucible, then outward over the edge of the crucible and downward along the wall of the crucible, thence underneath the bottom of the crucible, thence through the opening 25 in the uppermost bottom wall of the oven, thence through the spaces between the spacers underneath the uppermost wall and thence outward through the flue 28, part of the flame passing from above the uppermost bottom wall of the oven through the port 31 into the flue 32. From these flues the flame is conducted by a common flue 34 to the annealing furnace.

While passing through the opening 25 the flame heats the upstanding wall 35 of a conventional nozzle 36 which is concentrically disposed in the bottom wall of the oven, with relation to the crucible and heats the nozzle so that the molten glass flowing through the discharge opening 37 in the bottom of the crucible will be heated and maintained in a working condition, while being severed by the conventional shear 38 disposed below the nozzle.

The flow of molten glass through the discharge opening 37 in the crucible is controlled through the medium of a control tube 39 which enters the crucible through the arched top of the oven, and a forming tube 40 which is axially mounted in the control tube. The control tube is provided with an enlarged lower end having the edge disposed in a plane oblique to the axis of the tube so that an opening will always exist between the bottom of the tube and the bottom of the crucible through which all of the contents of the crucible will drain, the rate of discharge being controlled in part by raising or lowering the tube to increase or diminish the size of the opening.

The forming tube projects through the opening 37 in the bottom of the crucible and is provided with an enlarged end which confronts the discharge opening in the nozzle. Air, under alternately diminished and increased pressure is fed to the forming tube through the medium of a conventional impulse device comprising a diaphragm 41 having its stem 42 moved by a driven cam 43 through a return cycle to maintain a pulse in the air column timed according to the shape of the cam.

The rate of flow through the opening 37 may be controlled by raising or lowering the forming tube 40 so that a greater or less distance will be effected between the lower end of the tube and the nozzle. For this purpose a manually rotatable shaft mechanism designated in general by the numeral 44 is provided with a screw 45 having a nut 46 thereon which is pivotally connected to an annular rock lever 47 having the free leg pivotally connected in any preferred manner to the upper end of the forming tube.

The rate of the discharged gob of glass is controlled by controlling the level of molten glass in the control tube 39. This is accomplished by raising or lowering the control tube to increase or diminish the space between it and the bottom of the crucible. For this purpose the upper end of the control tube is equipped with a cylindrical hub 48 which is mounted to slide vertically in a bearing 49 carried by a bracket 50 which is secured to a horizontal support 51 of any preferred type. A lever 52 is pivotally connected intermediate its ends to a standard 53 which rises from the support 51. One end of the lever is pivotally connected in any preferred manner to the hub 48 and the opposite end of the lever is pivotally connected in any preferred manner to a nut 54 mounted on a feed screw 55 which is actuated through the medium of a reversing motor 56, there being a reduction gear mechanism 57 of conventional type which connects the motor shaft to the feed screw 55. Usually the motor is actuated by remote control, through the medium of a weighing device of conventional type.

A thermocouple 58 is mounted in the arched top 11 of the oven and thermocouples 59 and 60 are mounted respectively in the nozzle and in the opening 25 in the bottom of the oven. These thermocouples are connected as usual to respective potentiometer type control relays for maintaining any predetermined temperature of the flame.

In Figure 5 there is shown a modified form of the invention in which the only change is that a partition 61 is provided to divide the crucible into compartments which respectively receive distinctively colored glass batches to be simultaneously melted and blended when the forming tube 40 is raised to allow both melted batches to flow through the discharge opening and intermingle while flowing to provide a multicolored glass product.

In operation the flame from the burning fuel contacts direct with the glass batch in the crucible and also contacts with the entire interior surface of the crucible, as well as the exterior surface of the nozzle 15 to maintain these parts heated to the desired temperature. Thus it will be seen that the glass batch is melted, refined and fed from a single crucible so that a great economy in fuel is promoted while at the same time loss of fuel efficiency through conduction is positively prevented by the insulation 15 on the walls and top of the oven.

From the above description it is thought that the construction and operation of the invention will be fully understood without further explanation.

What is claimed is:

1. A crucible glass feeder comprising an oven, means for directing a flame downward into the oven, a crucible in the oven, said crucible being arranged to intercept the flame as it enters the oven, means spacing the crucible throughout its entire exterior surface from the oven, superposed bottom walls for the oven forming a passage therebetween through which the flame may escape from underneath the crucible and pass outwardly to the exterior of the oven, a discharge nozzle depending from the crucible in the path of said flame, a control tube disposed axially in the crucible and having its lower end adapted to be spaced from the bottom of the crucible to establish communication between the crucible and the nozzle, and a forming tube slidably mounted in the control tube and having its lower end disposed in the nozzle.

2. A crucible glass feeder comprising an insulated oven, means for directing flame downwardly through the top of the oven to the interior of the oven, a crucible in the oven adapted to intercept the flame and spread the flame toward the sides of the oven, a discharge nozzle connected with the bottom of the crucible and opening through the bottom of the oven, a control tube depending from the top of the oven and having the open bottom disposed in a plane oblique to the axis of the tube for establishing communication between the crucible and the nozzle, a forming tube disposed axially in the control tube and having the lower end disposed in the nozzle, means for moving the control tube and forming tube relatively to each other to regulate the discharge of molten metal through the nozzle, and means supporting the crucible in the oven and forming channels through which flame may pass downward through the entire exterior of the crucible and against the nozzle, thence to the exterior of the oven.

CLYDE C. COOK.
DAVID W. COOK.